No. 784,003. PATENTED FEB. 28, 1905.
H. J. HOEGH.
TOOL SUPPORT.
APPLICATION FILED JULY 25, 1902.
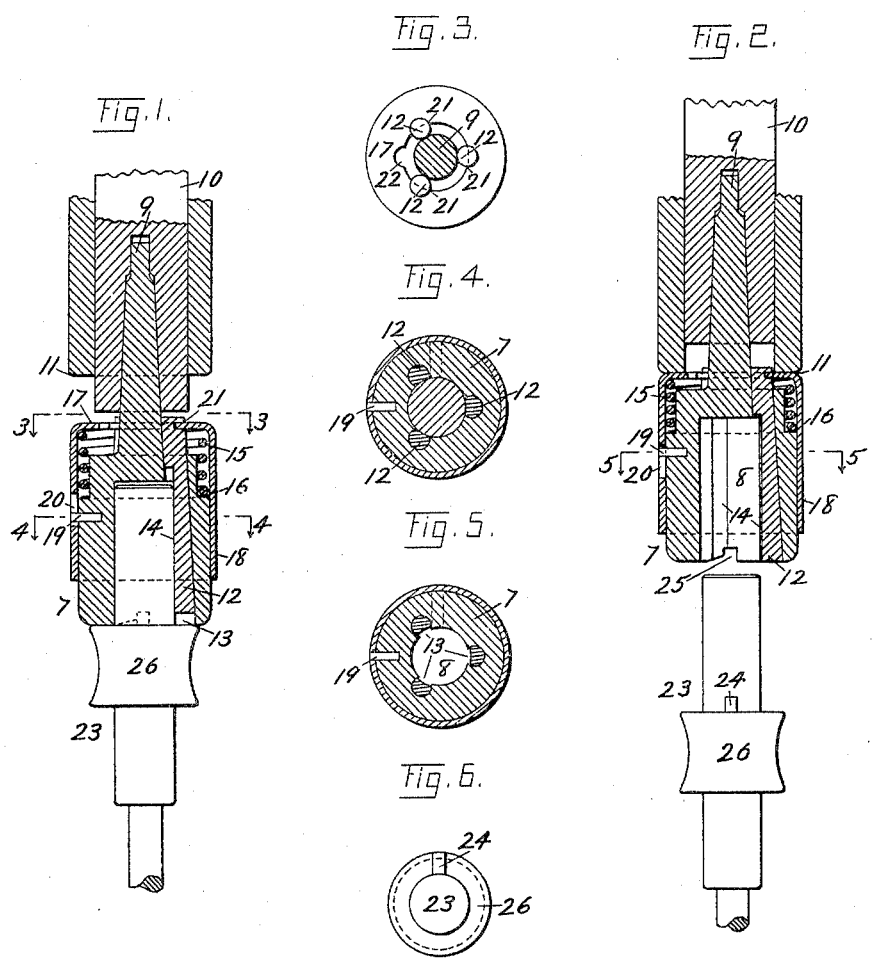
ATTEST
Frank H. Vick
J. W. Runnow
INVENTOR
Hans Jorgen Hoegh
by Sydney Irvin Prescott,
Atty.

No. 784,003.

Patented February 28, 1905.

UNITED STATES PATENT OFFICE.

HANS JORGEN HOEGH, OF NEW YORK, N. Y.

TOOL-SUPPORT.

SPECIFICATION forming part of Letters Patent No. 784,003, dated February 28, 1905.

Continuation in part of application Serial No. 70,335, filed July 31, 1901. This application filed July 25, 1902. Serial No. 116,958.

*To all whom it may concern:*

Be it known that I, HANS JORGEN HOEGH, a citizen of the United States, residing at New York, in the county and State of New York, have invented new and useful Improvements in Tool-Supports, of which the following is a specification.

This invention relates to an improvement in tool-supports.

In manufacturing operations involving the use of a plurality of tools for analogous purposes, particularly in the construction of machines made up of interchangeable parts, it is desirable that the time lost in making the necessary change of tools between successive operations be reduced to a minimum.

One of the objects of this invention is therefore to provide means for releasing a tool from its support during a movement of the latter away from the work after the tool has effected its purpose and without the application of force to the tool.

Another object is to provide means controlled by a movement of the support for clamping a tool to said support.

Another object is to provide frictional means for preventing movement of a tool in one direction with respect to the support and unyielding means for preventing the movement of the tool with respect to the support in another direction.

Still another object is to provide means whereby a tool may be clamped to or released from a support during a movement of the latter and while it is rotating.

With these and other objects in view the invention consists in certain constructions and combinations, as will be hereinafter fully described and then specifically pointed out in the claims hereunto appended.

In the accompanying drawings, which form a part of this specification, and in which like characters of reference indicate the same parts, Figure 1 is a longitudinal section of a device constructed in accordance with the invention. Fig. 2 is a similar section showing the parts in a different relative position. Fig. 3 is a section on the line 3 3 in Fig. 1. Fig. 4 is a section on the line 4 4 in Fig. 1. Fig. 5 is a section on the line 5 5 in Fig. 2, and Fig. 6 is a plan view of a tool-carrying collet.

Referring to the drawings, 7 indicates a tool-support which may be greatly varied in construction. In the device selected to illustrate the invention this tool-support consists of a cylindrical block having an axial aperture 8 therein. Any suitable means may be used for the purpose of securing the support 7 to an element of the machine in connection with which it is used. As shown, the support 7 is provided with a tapered shank 9, which is driven into a spindle 10, arranged to positively rotate in a suitable bearing. The spindle 10 has a reciprocatory movement also, and it follows that the support is moved with the spindle. The means for rotating and reciprocating the spindle are not shown. Any known means for effecting the desired result may be employed. The aperture 8 may be tapered, so that the tool will be held therein without the aid of other means or the tool may be held therein by frictional contact with parallel walls; but in the preferred form of construction separate means for clamping the tool are employed. As shown, the walls of the aperture 8 are parallel, and while the means for clamping a tool therein may be greatly varied in construction I prefer to use friction clamping means, which may or may not be the sole clamping means and which prevents movement of the tool with respect to the support in one direction—namely, along the axial line of the aperture. These means may be of any approved construction. As shown, a wedge or plurality of wedges 12 are mounted in and are longitudinally movable with respect to a recess or plurality of recesses 13, located in the wall of said aperture 8 and which are preferably inclined to the axis of the aperture. These wedges are of a form which will insure their retention in the recesses, being preferably segmental in cross-section throughout that portion acting as wedges. The wedges are formed of stock cylindrical rod faced off on one side to form a clamping-face 14 parallel to the axial line of the aperture, and it is obvious that when a relative movement between the wedges and support takes place these faces 14 will approach or recede from the axial line of the support and clamp a tool to or release it from said support. It is desirable that this clamping movement be produced and controlled by the movement of the support. It is desirable also that the tool be released or set free from restraint without the application of force to the tool. To this end means are provided for releasing a tool from the moving support. These means may be widely varied in construction. As shown, the wedges are held in clamped position by means of a spring 15; but any other suitable means may be employed in place of said spring. The spring 15 is preferably seated on a shoulder 16, formed on the support 7, and while the spring may be directly connected with the wedges other means are preferably interposed for the purpose of connecting said spring and wedges. These means may also be varied in construction. As shown, the spring 15 bears upon the inturned flange 17 of a sleeve 18, loosely mounted on the support 7 outside of the spring. The movement of the sleeve is or may be limited by a stop 19, fixed in the side of the support, said stop projecting through the wall of the sleeve which is at this point provided with a slot 20, permitting a limited movement of said sleeve. As shown, the heads of the wedges 12 are transversely slotted at 21, and the inturned flange 17 engages these slots, securing unanimity of action in said wedges and preventing them from turning on their axes. The wedges are entered in engagement with said flange 17 through a recess 22, formed in the flange, after which the sleeve is turned and the stop 19 fixed in position, thereby preventing rotation of the sleeve with respect to the support.

It will be seen that when a tool is held in the aperture 8 by means of the spring-held wedges reaction upon said wedges against the force of the spring is necessary to release the tool. This reaction may be effected by means of a stationary or a moving element or elements suitable for the purpose. As shown, a stationary element or abutment 11 is used, and this abutment may be formed by the lower edge of the spindle-bearing or it may be formed by other means located in operative position with respect to the support. It will be readily seen that when the support is moved from the position shown in Fig. 1 to that shown in Fig. 2 the sleeve 18 will come in contact with the abutment 11 and the wedges will be stopped thereby. A further movement of the support in the same direction will compress the spring, which at this time is functionless, and owing to the inclination of the recesses 13 to the axial line of the support, which is in this case the line of movement of said support, the clamping-faces 14 will recede and release the tool, which is then free to drop out. It is obvious also that when the support is moved in the opposite direction away from the abutment the wedges are held against longitudinal movement by the spring until the tool is clamped by the reverse action of the wedges in the recesses, after which the wedges are held in clamping position by the spring. The function of the spring, it will be seen, is to hold the wedges, not to move them, the clamping action being produced and controlled by movement of the support acting through the formation of the recesses 13.

While the wedges may in some cases be depended upon to rotate the tool as well as to retain the tool in the aperture 8, preferably other means will be used to prevent movement of the tool with respect to the support in a direction other than on the axial line of the support. These means may be greatly varied and may be carried directly by the tool; but, as shown, a tool-carrying collet 23 is employed which is provided with a spur 24 for engagement with a notch 25, formed in the wall of the support, this construction forming unyielding means for preventing a relative rotatory movement between the support and tool under any strain. The tool is secured to the collet by any known means—as, for instance, by means of a tapered shank. The collet is preferably provided with an enlarged concaved hub 26 circular in cross-section to permit its rotation in the fingers of the operator while inserting the tool in the aperture when the support is rotating.

In constructing the support and clamping devices shown in illustration of the invention the support is drilled for the inclined recesses and then the aperture 8 is drilled out, opening into said aperture the holes previously drilled, and thus forms the recesses and aperture by simple drilling operations. It has already been pointed out that the wedges are simply stock cylindrical rod faced off on one side. This construction constitutes a material advance in the art of chuck-making, as much less labor is involved than when ways have to be planned or milled out, and the resulting device is superior to the older ones, owing to its greater simplicity and increased durability.

It is believed that a more detailed description of the operation of the device is unnecessary.

It is to be clearly understood that the invention is not to be limited to the construction shown, and although the construction shown is especially adapted for use in connection with a drill-press it may also be used in machines of other types and for purposes other than the support of a tool, that such other use is contemplated, that parts of the mechanism are capable of use independent of other parts, and that such independent use is contemplated.

What is claimed is—

1. The combination with a tool-support having a movement toward and away from the work, of an abutment and coöperating means arranged to be brought into operation by a movement of the support to clamp or unclamp a tool.

2. The combination with a tool-support having a movement toward and away from the work, of a clamping-wedge, and an abutment and coöperating means arranged to be brought into operation by a movement of the support to clamp or unclamp a tool.

3. The combination with a tool-support having a movement toward and away from the work, of a spring-held clamping-wedge, and an abutment and coöperating means arranged to be brought into operation by a movement of the support to clamp or unclamp a tool.

4. The combination with a tool-support having a movement toward and away from the work, of a plurality of clamping-wedges, and an abutment and coöperating means arranged to be brought into operation by a movement of the support to clamp or unclamp a tool.

5. The combination with a tool-support having a movement toward and away from the work, of a plurality of spring-held wedges, a sleeve engaging said wedges, and a coöperating abutment arranged to be brought into operation by a movement of the support to clamp or unclamp a tool.

6. The combination with a tool-support having a movement toward and away from the work, of friction clamping means, unyielding means for locking a tool to said support, and an abutment and coöperating means arranged to be brought into operation by a movement of the support to clamp or unclamp a tool.

7. The combination with a tool-support, having a movement toward and away from the work and being provided with an axial aperture having a segmental recess located in its wall and inclined from its axis, a segmental wedge mounted in said recess, and an abutment and coöperating means arranged to be brought into operation by a movement of the support to clamp or unclamp a tool.

8. The combination with a tool-support having a movement toward and away from the work and being provided with an axial aperture having a plurality of segmental parallel-sided recesses located in its wall and inclined from its axis, a plurality of segmental wedges mounted in said recesses, and an abutment and coöperating means arranged to be brought into operation by a movement of the support to clamp or unclamp a tool.

9. The combination with a movable tool-support having an axial aperture therein provided with a segmental parallel-sided recess located in its wall and inclined from its axis, of a clamping member movably mounted in said recess said member being constructed of a cylindrical rod faced off on one side to form a segmental wedge having a clamping-face parallel to the axis of the aperture, and an abutment and coöperating means arranged to be brought into operation by a movement of the support to clamp or unclamp a tool.

In testimony whereof I have signed my name to this specification in the presence of two subscribing witnesses.

HANS JORGEN HOEGH.

Witnesses:
TORVALD W. RUNNOW,
J. R. ANDERSEN.